United States Patent [19]

Falk

[11] 4,155,223

[45] May 22, 1979

[54] TANDEM BRAKE MASTER CYLINDER WITH AUXILIARY PISTON

[75] Inventor: Edward J. Falk, Saint Louis County, Mo.

[73] Assignee: Wagner Electric Corporation, St. Louis, Mo.

[21] Appl. No.: 836,831

[22] Filed: Sep. 26, 1977

Related U.S. Application Data

[63] Continuation of Ser. No. 667,426, Mar. 16, 1976, abandoned.

[51] Int. Cl.² ............................................. B60T 11/20
[52] U.S. Cl. ...................................... 60/562; 60/577; 60/588; 60/592
[58] Field of Search ................. 60/562, 577, 579, 588, 60/592, 589

[56] References Cited

U.S. PATENT DOCUMENTS

| | | | |
|---|---|---|---|
| 2,732,918 | 1/1956 | Hackworth | 60/562 |
| 3,487,641 | 1/1970 | Hackett | 60/589 |
| 3,633,367 | 1/1972 | Baldwin | 60/589 |
| 3,800,538 | 4/1974 | Jones | 60/562 |
| 3,818,706 | 6/1974 | Gaiser | 60/562 |

FOREIGN PATENT DOCUMENTS

| | | | |
|---|---|---|---|
| 62951 | 6/1952 | France | 60/589 |
| 652635 | 2/1963 | Italy | 60/562 |

*Primary Examiner*—Martin P. Schwadron
*Assistant Examiner*—Abraham Hershkovitz
*Attorney, Agent, or Firm*—Eyre, Mann, Lucas & Just

[57] ABSTRACT

An auxiliary compensating piston in a tandem automotive master cylinder containing two pressure pistons closes relief port holes between the cylinder and brake fluid reservoirs. A compensating valve feeds replacement fluid into the cylinder during brake release. The auxiliary compensating piston opens the relief port holes at the end of brake release to relieve excess brake fluid from the cylinder.

4 Claims, 5 Drawing Figures

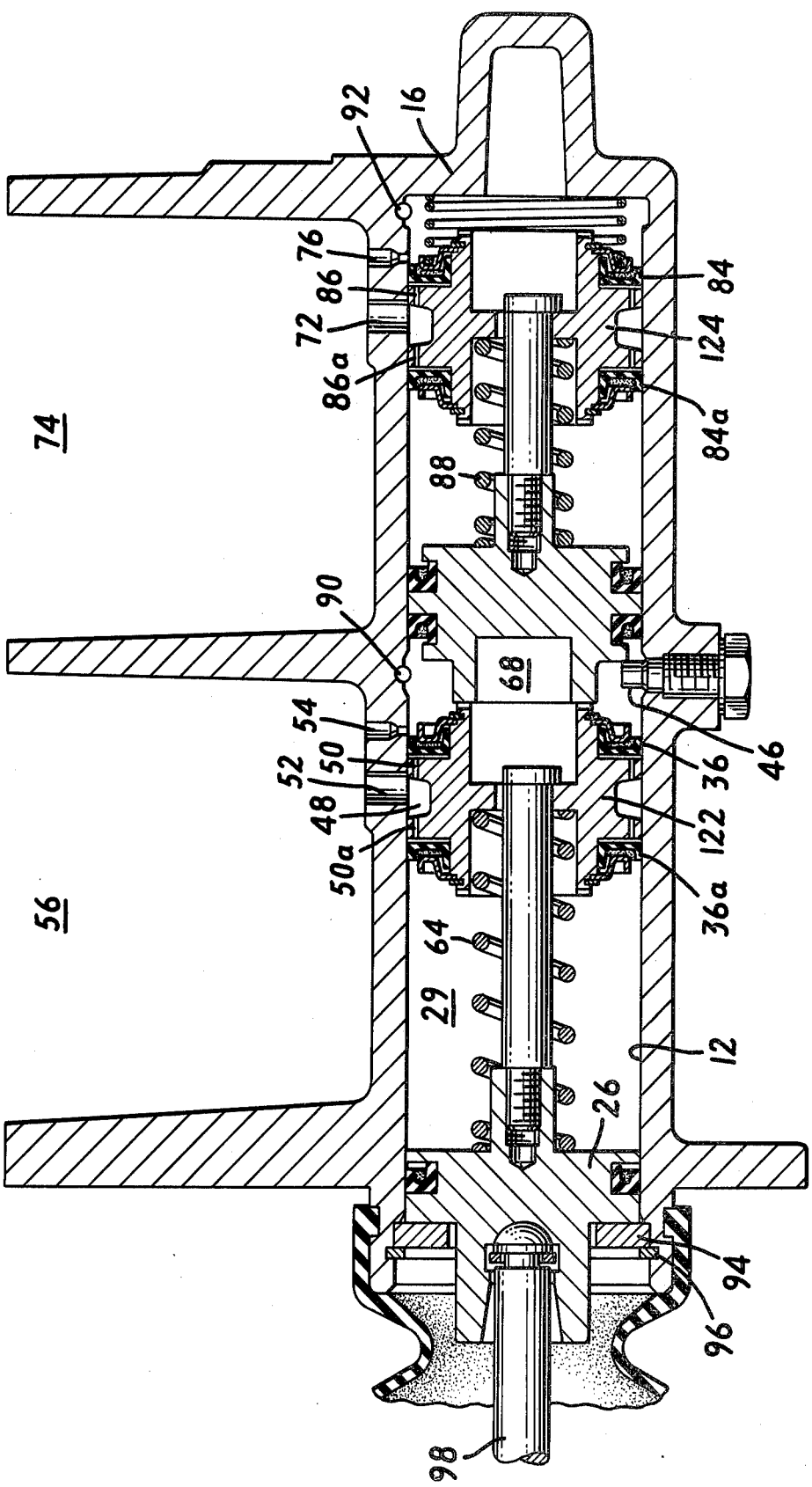

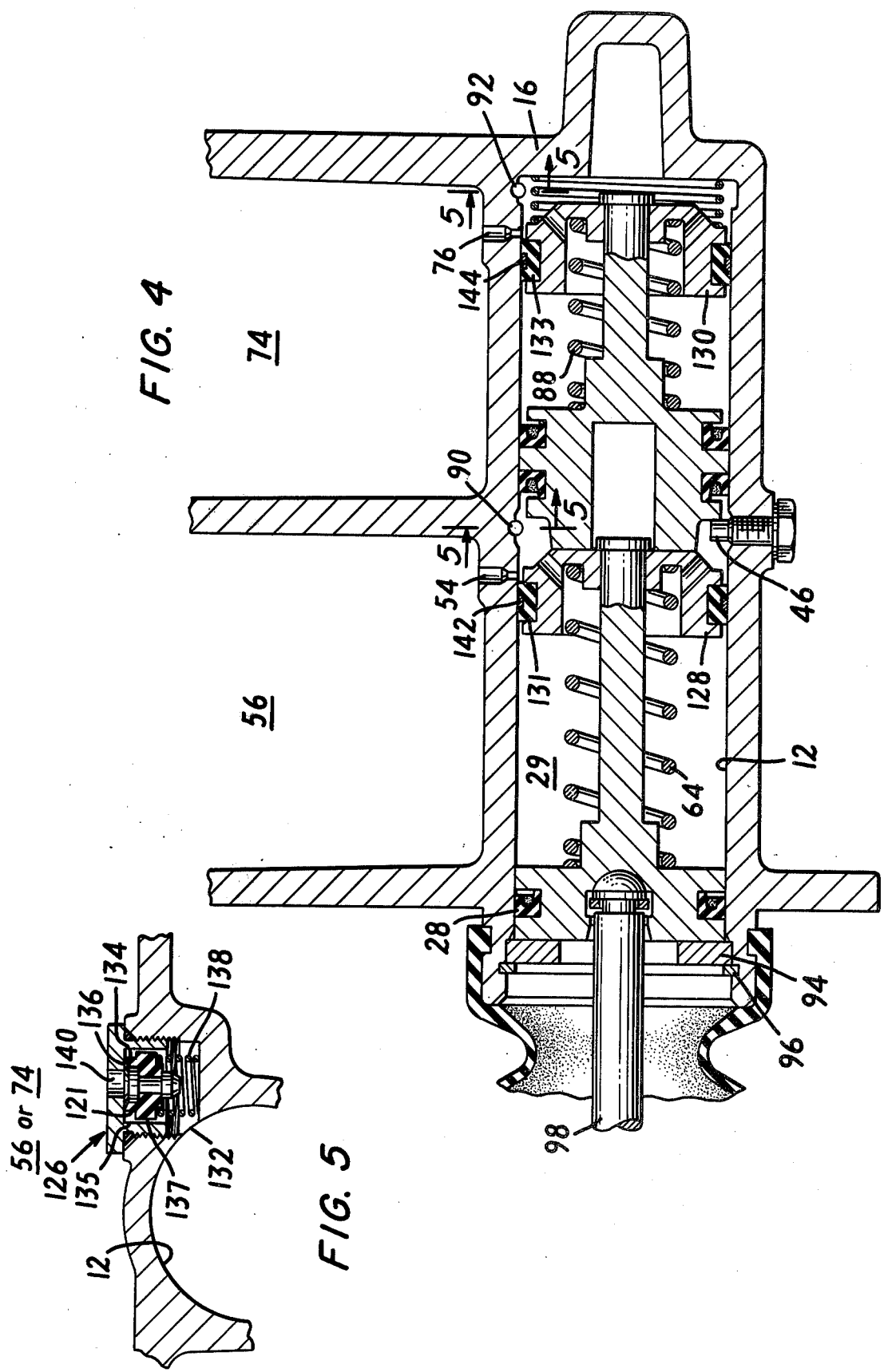

TANDEM BRAKE MASTER CYLINDER WITH AUXILIARY PISTON

This is a continuation of application Ser. No. 667,426, filed Mar. 16, 1976, now abandoned.

BACKGROUND OF THE INVENTION

The modern brake master cylinder practice of placing primary and secondary pistons in tandem in a single master cylinder tends to increase the length and weight of the brake master cylinder. Increasing size and weight of accessories runs counter to the desire for smaller and lighter vehicles. In addition, in large vehicles such as trucks, the mass becomes too great to support in the usual cantilever fashion. The additional support bracket required further increases vehicle weight.

In a conventional brake master cylinder, the piston must be longer than its stroke and have a resilient seal near each of its ends. A passage for compensation brake fluid from a fluid reservoir communicates with the perimeter of the piston between the two seals. The two seals must continue to enclose the fluid passage throughout the limits of motion of the piston. Thus the cylinder must necessarily be longer than twice the axial piston motion.

The problem is multiplied in a tandem brake master cylinder containing two pistons. Normally, failure in one of the two quasi-independent brake systems allows the associated piston to pass to its limit before the remaining piston may begin supplying brake pressure. Thus the piston located deeper in the bore must be longer than its axial motion. The piston located nearer the mouth must be long enough, not only to cover its own normal axial motion but also must continue to work as it follows the deeper piston into the cylinder in the event of failure in the part of the system associated with the deeper piston. Thus the shallower piston must have a length exceeding the sum of the axial motions of the deeper and shallower pistons. The total length of the cylinder can thus exceed five times the axial displacement of one piston.

Prior solutions have concentrated on removing the compensation function from the cylinder bore and transferring it to compensation valves outside the bore. For example, U.S. Pat. Nos. 3,818,706 and 3,879,947 disclose hinged unidirectional valves which allow the entry of brake fluid into the cylinder during the partial vacuum created in the cylinder during brake release and which are mechanically tilted into the open position by leverage exerted by the pistons as they return to their fully brakes-off position. When tilted open in this manner, excessive brake fluid in the cylinder is relieved to the reservoir during brakes off. Although this solution succeeds in shortening and consequently lightening the brake master cylinder, the hinged tilt valves are prone to allowing dirt particles to wedge into their seat regions. Lacking large fluid flow or motion to dislodge the dirt, the tilt valve can fail to seal. This failure allows fluid pressure bleedoff into the brake fluid reservoir rather forcing the pressure into the brakes.

The prior art fails to disclose a brake master cylinder in which the sealing and compensation functions are performed by limited stroke auxiliary pistons.

SUMMARY OF THE INVENTION

The bore of a tandem brake master cylinder contains primary and secondary pressure pistons which divide the bore into primary and secondary cylinder portions. If a malfunction occurs which renders the maintenance of brake pressure in either primary or secondary cylinder impossible, the remaining piston is enabled to continue functioning by the design of the master cylinder.

A port hole normally provides fluid communication between each cylinder portion and its associated independent master cylinder when the brake system is fully disengaged. The port holes allow for the venting of fluid to and from the cylinders to equalize the pressure due to fluid expansion or loss.

The master cylinder also contains a compensation piston having a resilient seal. Upon initial motion of a pressure piston, the compensation piston is moved to a location where it seals one port hole in each cylinder against outward flow of pressure from its cylinder to its reservoir.

Upon brake release, the rapid return of primary and secondary pistons to their rest positions creates a partial vacuum in their respective cylinder portions. Make-up fluid is drawn past the flexible lips of the flexible-lip seal in the compensating piston. When the primary and secondary pistons reach their rest positions, the compensating piston again uncovers primary and secondary cylinder port holes through which excess fluid may be vented to the respective reservoirs.

Another embodiment of the invention retains the port-hole sealing function of the compensating piston but removes the fluid-makeup function to a poppet valve located external to the cylinder.

Other embodiments use two compensating pistons rather than one.

BRIEF DESCRIPTION OF THE DRAWINGS

FIG. 3 shows a cross-sectional view of a second alternative embodiment of the invention.

FIG. 4 shows a cross-sectional view of a third alternative embodiment of the invention.

FIG. 5 shows a fragmentary cross-sectional view of an external poppet type compensator valve taken along the line 5—5 in FIG. 4.

DETAILED DESCRIPTION OF THE PREFERRED EMBODIMENT

Figure 1:
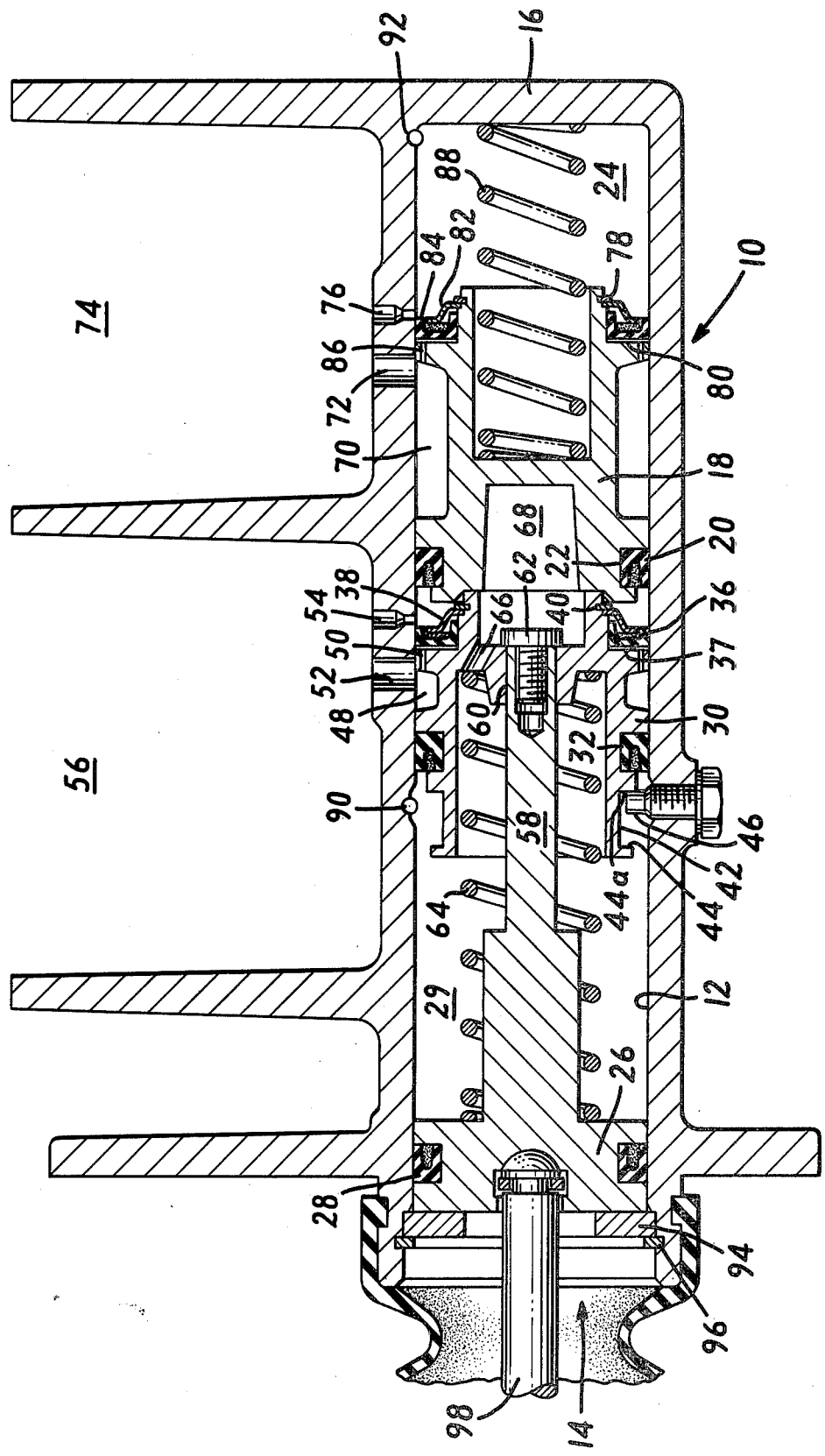
FIG. 1 shows a cross-sectional view of an embodiment of the invention taken vertically through the axis of the cylinder.

As shown in FIG. 1, the tandem master cylinder 10 contains a longitudinal cylindrical bore 12 having an open end 14 and a closed end 16. A secondary piston 18, having a resilient flexible lip seal 84 in its rightward end defines, between itself and the closed end 16, a secondary cylinder 24. A primary piston 26, having a resilient annular seal 28, defines between itself and a resilient annular seal 20 on the secondary piston, a primary cylinder 29.

A compensator piston 30 is positioned in the bore 12 in an intermediate location between the primary piston 26 and the secondary piston 18. The compensator piston 30 has a resilient annular seal 32 engaged in a groove 34 on its end nearer the primary piston 26, and an annular flexible-lip cup-type seal 36 retained against a shoulder 37 on the end of the compensator piston 30 nearer the secondary piston 18. Forward motion of the lip of the flexible-lip cup-type seal 36 is limited by an annular retainer 38 held in place by a spring washer 40.

A groove 42, having shoulders 44 and 44a at its ends, is located in the perimeter of an extension of the compensator piston 30. A bolt 46 protruding radially into the bore 12 toward the groove 42 limits the axial displacement of the compensator piston 30 by interference with one of the shoulders 44 or 44a.

A cylindrical guide rod 58, protruding axially from the working face of the primary piston 26 is slideably fitted into an axial hole 60 in the compensator piston 30. An enlarged head 62 on the end of the guide rod 58 prevents withdrawal of the guide rod 58 from the axial hole 60.

A primary piston return spring 64 is biased between the primary piston 26 and the compensator piston 30.

A compensator piston fluid channel 66 provides fluid flow from the primary cylinder 29 to the intermediate volume 68 between the compensator piston 30 and the secondary piston 18. Because of the fluid channel 66, the intermediate volume 68 is effectively made a part of the primary cylinder 29.

The secondary piston 18 contains an annular secondary feed groove 70 in its perimeter. A secondary outlet port 72 provides fluid communication between a secondary reservoir 74 and the secondary feed groove 70. The length of the secondary feed groove 70 is approximately equal to the travel of the secondary piston 18. Thus the fluid communication between the secondary reservoir 74 and the feed groove 70 is maintained throughout the operation of the secondary piston 18. A secondary port hole 76 provides fluid communication between the secondary reservoir 74 and the secondary cylinder 24 while the secondary piston 18 is in its rest position shown.

A flexible-lip type seal 84 is positioned against a shoulder 80 on the end of the secondary piston 18. An annular retainer 82 retained in position by a spring ring 78 limits the forward movement of the flexible-lip seal 84. The flexible-lip seal 84 is positioned adjacent to the secondary port hole 76 in order that the first movement of the secondary piston 18 causes the port hole 76 to be covered by the flexible lip seal 84.

A plurality of small secondary channels 86 provide fluid communication between the secondary feed groove 70 and the shoulder 80 behind the flexible-lip seal 84.

A secondary piston return spring 88 is biased between the closed end 16 and the secondary piston 18. The strength of the secondary piston return spring 88 is less than the strength of the primary piston return spring 64.

A primary feed groove 48 is located on the perimeter of the compensator piston 30 between the two resilient seals 32 and 36. A plurality of small primary channels 50 provide fluid communication between the primary feed groove 48 and the shoulder 37 behind the cup-type seal 36.

A primary outlet port 52 and a smaller primary port hole 54 provide fluid communication between a primary reservoir 56 and the bore 12. The primary outlet port 52 is located adjacent to the primary feed groove 48. The position and size relationships of the primary outlet port 52 and primary feed groove 48 are such that the fluid communication between the primary reservoir 56 and the primary feed groove 48 is maintained throughout the limited axial travel of the compensator piston 30. The primary port hole 54 is located adjacent to, and forward of, the flexible-lip seal 54 in the rest position of the compensator piston 30 shown. In this position, the primary port hole 54 is covered and sealed by the flexible-lip seal 36 upon the first movement of the compensator piston 30.

A primary feed outlet port 90 and a secondary feed outlet port 92 are located as high as possible in their respective cylinders to enhance the bleeding of air from the master cylinder. The primary 90 and secondary 92 outlet ports feed fluid pressure to their respective independent brake systems (not shown).

The outward limit of travel of the primary piston 26 is established by a piston stop ring 94 held in place by a spring ring 96.

The normal functioning of the embodiment shown in FIG. 1 is described in the following paragraphs.

Upon brake application, the push rod 98 urges the primary piston 26 rightward. Due to the greater strength of the primary piston return spring 29 as compared to the secondary piston return spring 88, the primary piston 26, compensator piston 30 and secondary piston 18 initially move rightward together.

Upon first motion, the two flexible-lip seals 36 and 78 cover and seal their respective port holes 54 and 76 allowing brake pressure to build up in their respective cylinders 29 and 24. After a short additional travel, further motion of the compensator piston 30 is halted by interference between the bolt 46 and the shoulder 44 of the groove 42. Additional forward movement of the primary piston 26 is enabled by the guide rod 58 sliding through the axial hole 60. The compensator piston fluid channel 66 communicates the fluid pressure in the primary cylinder 29 to the back face of the secondary piston 18. The secondary piston 18 is thus urged forward against the force of its return spring 88 until the fluid pressure in the secondary cylinder 24 is approximately equal to the fluid pressure in the primary cylinder 29.

When the brakes are released, push rod 98 moves rapidly leftward. The primary and secondary pistons 26 and 18, moving rapidly leftward under the combined urging of their return springs 64 and 88 cause a partial vacuum in their respective cylinders 29 and 24. The compensator piston 30 remains in its full rightward position at this time due to the continuing force of primary piston return spring 64. The partial vacuum in the primary cylinder 29 is communicated through the compensator piston fluid channel 66 to the flexible-lip seal 36 on the compensator piston 30. Brake fluid is drawn from the primary reservoir 56 through the primary outlet port 52, primary feed groove 48 and primary channels 50, and thence past the flexible-lip seal 36, through the intermediate volume 68 and fluid channel 66 to primary cylinder 29. Similarly, brake fluid is drawn from the secondary reservoir 74 through the secondary outlet port 72, secondary feed groove 70, and secondary channels 86, and thence past the flexible lip seal 84 into the secondary cylinder 24.

As the primary and secondary pistons 26 and 18 continue to travel leftward during brake release, the secondary piston 18 makes mechanical contact with the compensator piston 30 and the enlarged head 62 at the end of the guide rod 58 also makes mechanical contact with the perimeter of the hole 60. Depending on the relative brake fluid forces in the primary and secondary brake systems the two mechanical contacts with the compensator piston described in the preceding may take place in either order or simultaneously. Under the mechanical urging described, the compensator piston 30 moves leftward until its motion is stopped either by the mechanical stop of the primary piston 26 against the primary piston stop ring 96 or by the shoulder 44a in the groove 42 making contact with the bolt 46.

As the primary and secondary pistons 26 and 18 reach their rest positions shown, the two flexible lip seals 36 and 78 uncover their respective port holes 54 and 76. Excess brake fluid in the cylinders due to over replenishment during brake release or fluid expansion with heat is released through the port holes 54 and 76 into their respective reservoirs 56 and 74.

The following describes the operation of the system when a malfunction exists in the secondary brake system such that brake pressure cannot be maintained in the secondary cylinder 24.

Upon initial motion of the primary and secondary pistons 26 and 18, the primary and secondary port holes 54 and 76 are sealed by their respective flexible-lip seals 36 and 84 and the compensator piston 30 is urged to its mechanical stop as previously described. Fluid pressure is increased in the primary cylinder 29 by the continued motion of the primary piston 26. However, the absence of resisting fluid pressure in the secondary cylinder 24 allows the secondary piston 18 to continue its rightward motion against only the nominal resistance of its return spring 88. Brake fluid continuing to flow through the compensator piston fluid channel 66 continues to force the secondary piston 18 rightward until it is stopped by contact with the closed end 16. Thereupon, the secondary piston 18 stops moving thus allowing normal brake pressure to be established in the primary brake system. Compensation and relief are performed in the primary cylinder 29 as previously described.

The following describes the operation of the system when a malfunction exists in the primary brake system such that brake pressure cannot be maintained in the primary cylinder 29.

Upon initial motion of the primary and secondary pistons 26 and 18, the primary and secondary port holes 54 and 76 are sealed by their respective flexible-lip seals 36 and 84 and the compensator piston 30 is urged to its mechanical stop as previously described. Motion of the secondary piston 18, meeting fluid resistance in its cylinder 24, is brought to a stop. The primary piston 26, meeting no fluid resistance continues to travel rightward against the nominal pressure of its return spring 64. The guide rod 58 passes through the axial hole 60 until the end of the enlarged head 62 makes mechanical contact with the secondary piston 18. Thereupon, direct mechanical force from the push rod 98 is exerted on the secondary piston 18 through the intermediate force transmission by the guide rod 58. Thus normal brake forces are generated in the secondary brake system. Compensation and relief in the secondary brake system are performed as previously described.

Figure 2:
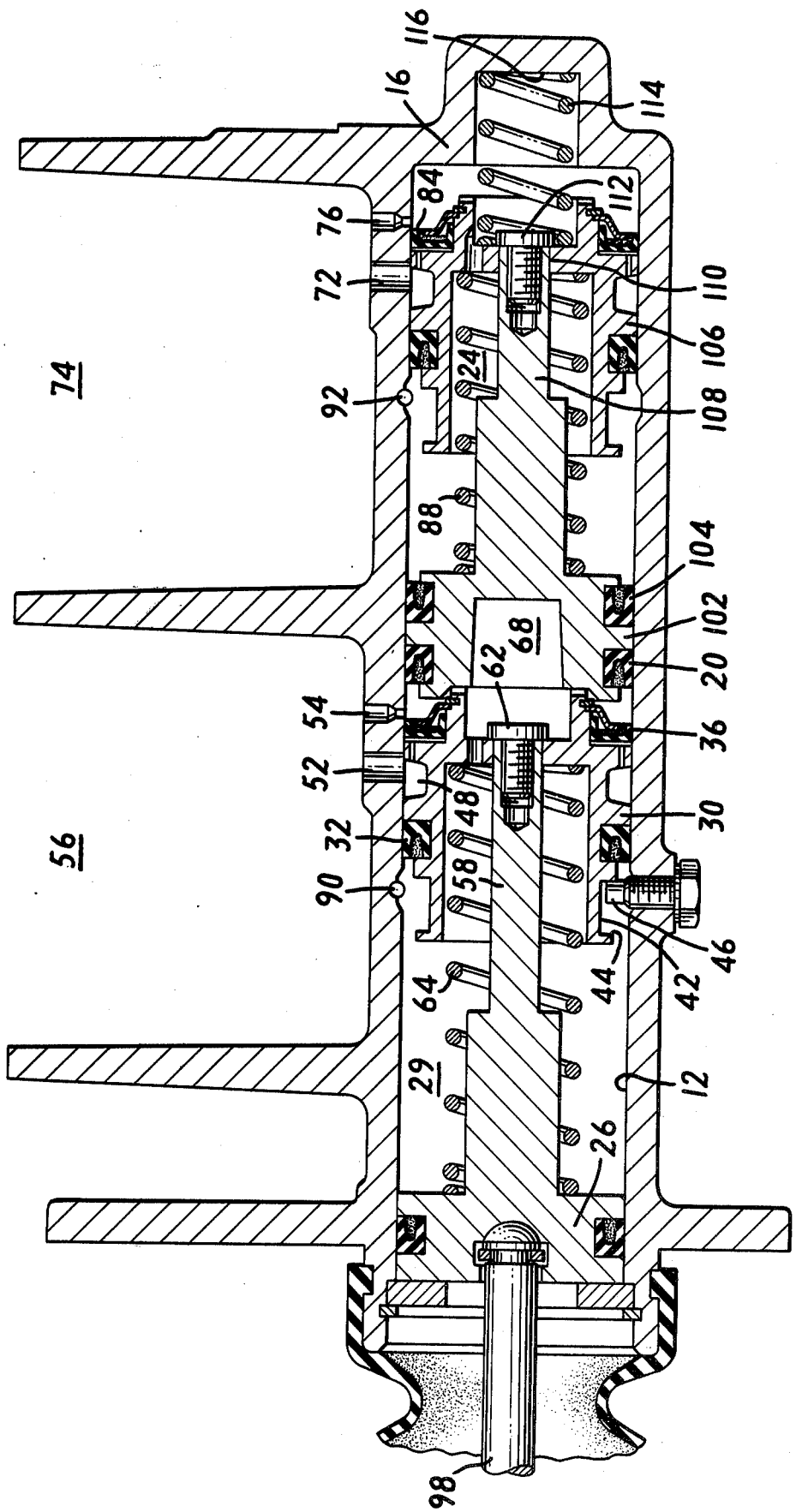
FIG. 2 shows a cross-sectional view of a first alternative embodiment of the invention.

A first alternative embodiment of the invention is shown in FIG. 2. Due to the basic mechanical and functional similarity of this embodiment to the one shown in FIG. 1 and described in preceding paragraphs, only the differences will be described in detail.

The secondary piston 102 contains a second resilient annular seal 104 facing in the opposite direction from the first resilient annular seal 20. A secondary compensator piston 106 is located in the secondary cylinder 24. The secondary compensator piston 106 is identical in structure and function to the compensator piston 30 previously described.

A secondary guide rod 108, on the face of the secondary piston 102 is slideably engaged in an axial hole 110 in the secondary compensator piston 106. An enlarged head 112 on the end of the secondary guide rod 108 prevents withdrawal of the secondary guide rod 108 from the axial hole 110. The secondary piston return spring 88 is biased between the secondary piston 102 and the secondary compensator piston 106. As in the preceding embodiment, the primary piston return spring 64 is stronger than the secondary piston return spring 88. A secondary compensator piston return spring 114, having less spring force than the secondary piston return spring 88, is biased between the secondary compensator piston 106 and a well 116 in the closed end 16.

The following describes the normal operation of the embodiment shown in FIG. 2.

Upon initiation of a braking action, push rod 98 force operating on the primary piston 26 is transmitted through primary piston return spring 64 to primary compensator piston 30, then through mechancial contact to secondary piston 102, and finally through secondary piston return spring 88 to the secondary compensator piston 106. Due to the relative strengths of the three return springs 64, 88 and 114, the four pistons 26, 30, 102 and 106 initially move as a unit compressing the secondary compensator return spring 114.

Upon initial motion of the two compensator pistons 30 and 106, the respective port holes 54 and 76 are covered and sealed by their associated flexible-lip seals 36 and 84. Motion of the primary compensator piston 30 is halted after a short distance as previously described. Motion of the secondary compensator piston 106 is halted after a similarly short travel by mechanical contact with the closed end 16. Further motion of the secondary piston 102 is enabled by the secondary guide rod 108 sliding through the axial hole 11 into the clearance provided by the well 116.

The failure mode of operation after failure in the primary brake system is identical to that previously described.

The operation of the system after failure in the secondary brake system is described in the following.

Lacking fluid pressure resistance, the secondary piston 102 continues to move rightward under the urging of fluid pressure in the primary cylinder 29 until the end of the enlarged head 112 makes contact with the end of the well 116. The secondary piston 102 thereafter stops moving allowing normal brake forces to develop in the primary brake system.

A second alternative embodiment of the invention shown in FIG. 3 is described in the following paragraphs insofar as it differs from the embodiments previously described.

The second alternative embodiment differs from the first alternative embodiment of FIG. 2 principally in that it contains two flexible-lip seals 36, 36a and 84, 84a on each of its two compensator pistons 122 and 124. Two sets of small primary channels 50 and 50a provide fluid communication from the primary feed groove 48 to the region behind the two flexible-lip seals 36 and 36a on the primary compensator piston 122. In this manner, compensation fluid can be supplied directly to the primary cylinder 29 and the intervening volume 68 to enable faster compensation. Similarly, two sets of small secondary channels 86 and 86a provide a path for compensation fluid simultaneously to the volumes on both sides of the secondary compensator piston 124.

Forward motion of the primary compensator piston 122 and return motion of the secondary piston are limited by mechanical interference between them and a bolt 44 located in the region between them. The normal and failure modes of operation of the second alternative embodiment is identical to that described in connection with FIG. 2.

A third alternative embodiment of the invention is shown in FIG. 4. This embodiment is similar to the two-compensator-piston embodiments shown in FIGS. 2 and 3 except that the compensator valve function, previously performed by flexible-lip seals has been removed from the cylinder. The compensation function in this embodiment is performed in an auxiliary compartment by poppet-type valves shown generally at 126 in FIG. 5. The remaining compensator pistons 128 and 130 merely serve to close and open the port holes 54 and 76 respectively.

Referring to FIG. 4, the seal on the compensator pistons 128 and 130 has been changed to a rectangular seal 131 and 133 respectively. A metal band 142 and 144 about each rectangular seal 131 and 133 respectively prevents seal extrusion into its associated port hole 54 and 76.

A poppet-type compensator valve 126 as shown in FIG. 5 is connected to each cylinder through a fluid channel 132. The fluid channel location 132 shown in the drawing conveniently coincides with the pressure outlet port 90 and 92 in each cylinder. A resilient valve 134 is held against its valve seat 136 by the negligible force of a spring 138. The resilient valve 134 is undersized for the valve cavity 135 in which it is fitted thus leaving flow space 137 along its sides. When in the closed position shown, the resilient valve 134 prevents fluid communication between the fluid reservoir 56 or 74 through the valve port 140, flow space 137 and the fluid channel 132 into the cylinder 12.

During brake release, the negative pressure across the resilient valve 134 causes the resilient valve 134 to be drawn away from its valve seat 136 against the negligible force of the spring 138. Compensating brake fluid is thus enabled to flow into the cylinder 12.

The motion of the primary compensator piston 128 is limited by interference with the bolt 46 such that the metal band 142 remains adjacent to the primary port hole 54. Similarly, the motion of the secondary compensator piston is limited by mechanical contact with the closed end 16 such that its metal band 144 remains adjacent to its port hole 76.

The operation of the third alternative embodiment is otherwise identical to embodiments previously described.

It will be understood that the claims are intended to cover all changes and modifications of the preferred embodiments of the invention, herein chosen for the purpose of illustration which do not constitute departures from the spirit and scope of the invention.

What is claimed is:

1. A brake master cylinder of the type using brake fluid comprising:
   (a) a body;
   (b) a cylindrical bore in said body having an open end and a closed end;
   (c) a primary pressure piston and a secondary pressure piston defining primary and secondary independent regions of said cylindrical bore;
   (d) two brake fluid reservoirs, each of said brake fluid reservoirs being associated with a particular one of said independent regions;
   (e) means for relieving excessive brake fluid from each of said two independent regions at the end of a brake release, said relief being through a port hole from the wall of said cylindrical bore into an associated brake fluid reservoir;
   (f) means for injecting compensating brake fluid from each of said reservoirs into its associated independent regions during release of the brakes;
   (g) at least one compensator piston means located in the bore between said primary and secondary pistons and movable relative to said primary and secondary pistons;
   (h) means for limiting said compensator piston means to first and second fixed predetermined operative positions within said bore during normal operation of said master cylinder, normal operation being defined as one where no more than nominal pressure exists in either independent region during the unactuated condition and substantially equal elevated pressure conditions exist in the two pressure regions during the actuated condition;
   (i) means connected to one of said primary and secondary pistons for moving said at least one compensator piston, during brake application, from its first position to its second position;
   (j) sealing means on the perimeter of said at least one compensator piston in sealing contact with the wall of said cylindrical bore for blocking the flow of fluid through at least one of said port holes when said at least one compensator piston is in its second position and reopening said port hole again when said compensator piston is in its first position;
   (k) channel means through said at least one compensator piston for maintaining the fluid pressure on the two sides thereof substantially equal;
   (l) an annular flexible lip seal on said compensator piston;
   (m) an annular groove in the perimeter of said compensator piston;
   (n) an outlet port providing fluid communication between said reservoir and said annular groove at all translational positions of said compensator piston;
   (o) at least one small channel providing fluid communication between said annular groove and the rear of said flexible lip seal;
   (p) said flexible lip seal being moved free of said port hole when said at least one compensator piston is moved to its first position whereby open fluid communication between associated reservoir and independent region is achieved; and
   (q) said at least one compensator piston dividing the cylindrical bore into a first chamber on the side thereof adjacent the primary piston and a second chamber on the side thereof adjacent the secondary piston, the first and second chambers being in continuous open communication through said channel means;
   (r) said flexible lip seal being operative to block the flow of fluid from said annular groove through said small channel and to said second chamber when the fluid pressure in said second chamber is higher than the fluid pressure in the associated fluid reservoir and for permitting fluid to flow therepast when the pressure relationships are reversed.

2. The brake master cylinder as recited in claim 1 further comprising:
   (a) a second annular flexible lip seal on said compensator piston; and (b) at least one small channel in said compensator piston providing fluid communication between said annular groove and the rear of said second annular flexible lip seal.

3. A brake master cylinder of the type using brake fluid comprising:
(a) a body;
(b) a cylindrical bore in said body having an open end and a closed end;
(c) a primary pressure piston and a secondary pressure piston defining primary and secondary independent regions of said cylindrical bore;
(d) two brake fluid reservoirs, each of said brake fluid reservoirs being associated with a particular one of said independent regions;
(e) means for relieving excessive brake fluid from each of said two independent regions at the end of a brake release, said relief being through a port hole into an associated brake fluid reservoir;
(f) means for injecting compensating brake fluid from each of said reservoirs into its associated independent regions during release of the brakes;
(g) a compensator piston means movable relative to said primary and secondary pistons;
(h) means for limiting said compensator piston means to first and second fixed predetermined operative positions within said bore during normal operation of said master cylinder, normal operation being defined as one where no more than nominal pressure exists in either independent region during the unactuated condition and substantially equal elevated pressure conditions exist in the two pressure regions during the actuated condition, said compensator piston means moving, during brake application, from its first position to its second position and having means for closing at least one of said port holes and moving to its first position reopening said port hole again when the brakes are released;
(i) said compensator piston means including a primary compensator piston in said primary independent region, and
a secondary compensator piston in said secondary independent region;
(j) a port hole in open fluid communication with one of said fluid reservoirs and terminating in the wall of said primary independent region;
(k) means connected to said primary pressure piston for translating said primary compensator piston;
(l) a first annular flexible lip seal on said primary compensator piston;
(m) an annular groove in the perimeter of said primary compensator piston;
(n) an outlet port providing fluid communication between said associated reservoir and said annular groove at all translational positions of said primary compensator piston;
(o) at least one small channel in said primary compensator piston providing fluid communication between said annular groove and the rear of said first flexible lip seal;
(p) a port hole in open fluid communication with a second of said fluid reservoirs and terminating in the wall of said reservoirs secondary independent region;
(q) means connected to said secondary pressure piston for translating said secondary compensator piston;
(r) a second anular flexible lip seal on said secondary compensator piston;
(s) a secondary annular groove in the perimeter of said secondary compensator piston;
an outlet port providing open fluid communication between said second reservoir and said secondary annular groove at all translation positions of said secondary compensator piston; and
(u) at least one small channel in said secondary compensator piston providing fluid communication between said secondary annular groove and the rear of said second flexible lip seal.

4. The brake master cylinder as recited in claim 3 further comprising:
(a) a third annular flexible lip seal on said primary compensator piston;
(b) at least one small channel in said primary compensator piston providing fluid communication between said annular groove and the rear of said third annular flexible lip seal;
(c) a fourth annular flexible lip seal on said secondary compensator piston; and
(d) at least one small channel in said secondary compensator piston providing fluid communication between said secondary annular groove and the rear of said fourth flexible lip seal.

* * * * *